Patented Nov. 28, 1922.

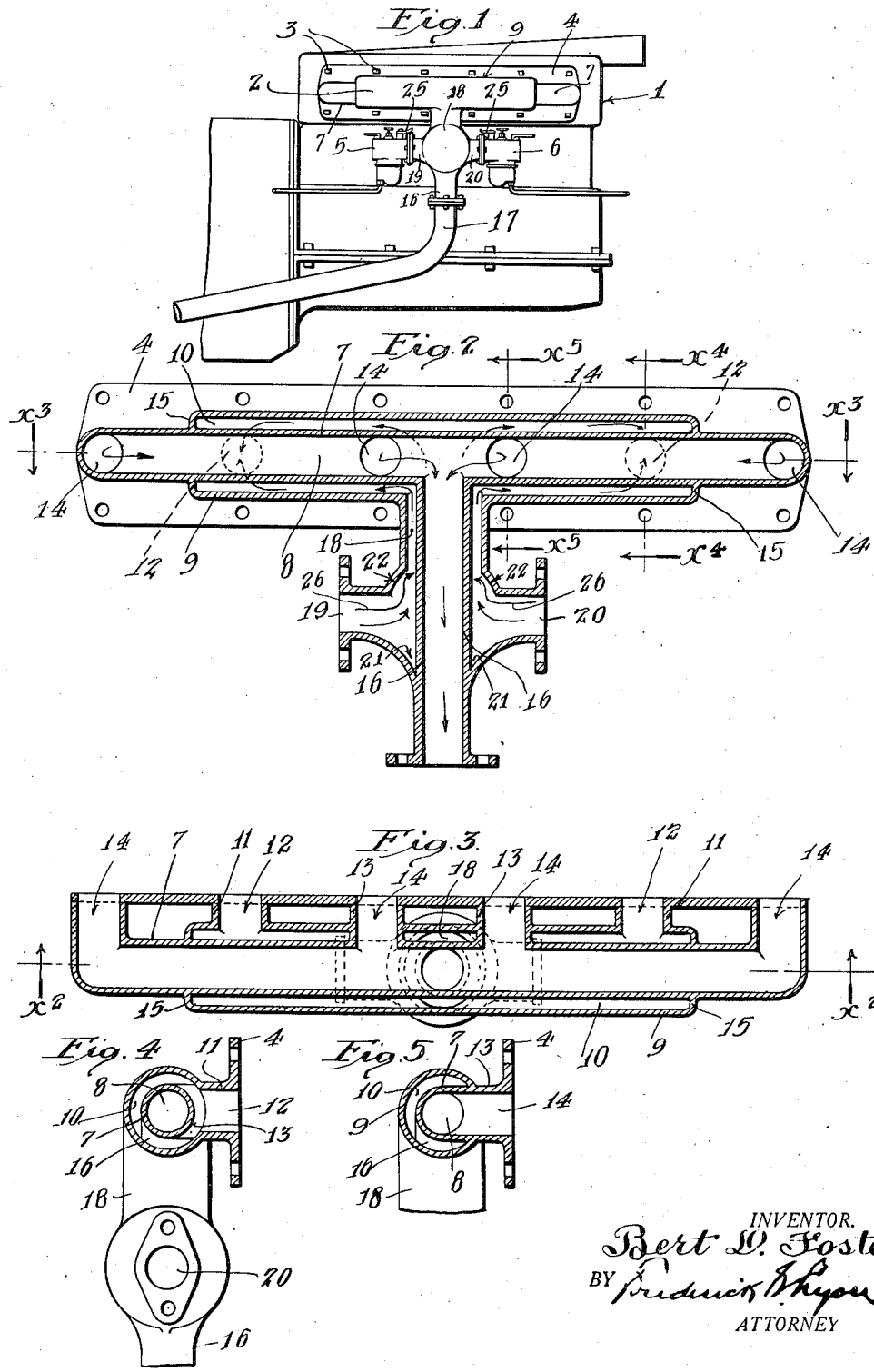

1,436,704

UNITED STATES PATENT OFFICE.

BERT D. FOSTER, OF SANTA MONICA, CALIFORNIA, ASSIGNOR OF ONE-HALF TO MINA L. MOHN, OF SANTA MONICA, CALIFORNIA.

INTERNAL-COMBUSTION-ENGINE MANIFOLD.

Application filed July 6, 1920. Serial No. 394,188.

*To all whom it may concern:*

Be it known that I, BERT D. FOSTER, a citizen of the United States, residing at Santa Monica, in the county of Los Angeles and State of California, have invented a new and useful Internal-Combustion-Engine Manifold, of which the following is a specification.

This invention relates to manifolds for internal combustion engines and is particularly directed to a fuel vaporizing manifold in which the heat of the exhaust gases is utilized to progressively raise the temperature of the fuel to the point of delivery to the engine.

The object of the invention is to provide a manifold in which the exhaust chamber extends through the intake chamber.

Another object is to provide a tubular exhaust manifold and a tubular intake manifold surrounding and spaced from the exhaust manifold and directing the incoming fuel directly against the exterior surface of the exhaust manifold and in which the fuel is directed axially along the exterior surface of the exhaust manifold to points of delivery to the engine.

Another object is to provide a combined exhaust and intake manifold, with the intake manifold surrounding the exhaust manifold and provided with a transverse fuel intake port and joined with the exhaust manifold to provide a fuel drip cup below the inlet port, the wall of the intake manifold formed to provide means for deflecting the fuel against the exhaust manifold.

Another object is to provide a one piece manifold of double wall formation providing a tubular exhaust manifold and an annular tubular intake manifold surrounding the exhaust manifold, the lateral inlet branches of the exhaust manifold extending through the intake manifold.

Another object is to provide a manifold having an exhaust manifold chamber within an intake manifold chamber provided with an intake port communicating with a source of supply of highly volatile fuel and an intake port communicating with a source of supply of heavier fuel, said ports directing the fuel against the exhaust manifold whereby the fuel is immediately broken into a finely divided state and subjected to the radiated heat from the exhaust manifold, the intake manifold directing the fuel longitudinally along the surface of the exhaust manifold to the point of delivery to the engine.

Another object is to provide a double walled tubular structure providing a central exhaust manifold and an annular surrounding intake manifold directing fuel longitudinally of the exhaust manifold, the arrangement and relative spacing of the walls providing a maximum area of surface for contact by the fuel and for a maximum agitation by skin friction.

Various other objects and advantages will be more fully apparent from the following description of the accompanying drawings which form part of this disclosure, which illustrate a preferred form of embodiment of the invention.

Of the drawings:

Figure 1 is an elevation of an engine equipped with the manifold of the present invention.

Fig. 2 is a longitudinal section on line $x^2$—$x^2$ of Fig. 3.

Fig. 3 is a longitudinal section on line $x^3$—$x^3$ of Fig. 2.

Fig. 4 is a transverse section on line $x^4$—$x^4$ of Fig. 2.

Fig. 5 is a transverse section on line $x^5$—$x^5$ of Fig. 2.

With reference to the drawings, 1 designates an engine and 2 the integral combined intake and exhaust manifold which is bolted to the side of the engine by bolts 3 engaging through suitable bolt holes in a flange plate 4 of the manifold, the ports of the manifold aligning with the corresponding ports of the engine and the opposed inlet ports of the intake manifold communicating with carbureters 5 and 6, of which the carbureter 5 may be assumed to be connected with a supply of gasoline or other corresponding volatile fuel and the carbureter 6 to be connected with a supply of some heavy fuel such as kerosene. Both of these carbureters are illustrated in more or less conventional form, without any attempt to indicate any special construction, since any of the many types of carbureters now on the market may be utilized, it being sufficient for the purposes of this disclosure to state that each carbureter has a suitable control valve as is indicated at 25.

The manifold comprises a double wall integral structure of T formation, the inner wall 7 forming an exhaust chamber 8 and the outer wall 9 being spaced from and surrounding the inner wall and forming therewith an annular intake chamber 10. The outer wall 9 has lateral branches 11 forming delivery ports 12 at opposite ends of the intake chamber and adapted to communicate with the intake ports of the engine, and the inner wall 7 has lateral branches 13 forming inlet ports 14 leading to the exhaust chamber and adapted to communicate with the exhaust ports of the engine. Two of the branches 13 extend through the intake chamber and the outer wall and the opposed ends of the outer wall joins to the outer surface of the inner wall as at 15, closing the opposite ends of the intake chamber 10.

Leading downwardly from the medial portion of the inner wall 7 is an exhaust conduit 16 having a flanged free end for connection to an exhaust pipe 17 (see Figs. 1 and 2) and surrounding and spaced from said conduit 16 is an intake conduit 18 having laterally disposed branches 19—20 forming fuel inlet ports. The lower end of the conduit 18 is joined with the outer surface of the exhaust conduit 16 to form a fuel drip cup as at 21, said cup being below the intake ports with its lowermost portion closely adjacent the exhaust conduit. The wall of the intake conduit 18 immediately above the fuel ports is arched as at 22 to form deflecting abutments, the function of said abutments and also of the fuel drip cup being later described in connection with the description of the operation of the entire device.

In starting the engine, the control valve 25 of the gasoline carbureter 5 is opened to admit fuel to the intake port 19. The engine, therefore, starts on a highly volatile fuel after the usual manner. The fuel is directed directly against the wall of the exhaust conduit 16 and is initially broken up by direct impact and any fuel which is not absorbed by the inflowing air current will settle into the drip cup at 21. The fuel impregnated air current in passing upwardly into the intake manifold is deflected or whipped inwardly against the exhaust conduit by the arched wall 22 of the intake conduit, as indicated by the arrow 26, to further break up the fuel by direct impact. In passing upwardly through the annular intake passage and through the intake manifold the fuel current is maintained in a violent state of agitation by the skin friction of the current against the inner surface of the outer wall and the outer surface of the inner wall and the two walls are spaced so that this skin friction effect extends across the entire area of the intake chamber so that there is no so called dead intermediate portion in the air current. The area of the intake manifold chamber is proportioned so that after taking care of the expansion of the incoming fuel current, there are no dead pockets or recesses, and so that the entire body of the fuel will always be in a state of violent agitation.

As the engine warms up, the heat radiated by the exhaust manifold and conduit acts to further vaporize the fuel, especially will it vaporize the fuel collected in the drip cup 21. After the engine has run a suitable length of time to become thoroughly warmed up, the control valve 25 of the gasoline carbureter may be closed and the control valve 25 of the kerosene carburetor opened, the exhaust manifold and conduit by this time radiating sufficient heat to thoroughly vaporize the heavier fuel.

It will be particularly noted that the fuel absorbs the radiated heat from the time of its entrance to the intake conduit to the time of its delivery to the engine and is progressively raised in temperature as it travels through the intake conduit and manifold. The provision of the drip cup and the arched deflecting walls will effectively prevent any solid fuel being carried to the engine.

It will be evident from the above that I have provided a manifold in which the heat radiated by the exhaust manifold is utilized to a maximum degree and which will effectively produce complete vaporization of heavy fuels.

I claim:

1. A device of the class described combining an exhaust manifold having an exhaust conduit, and an intake manifold surrounding and spaced from the exhaust manifold and having an inlet conduit surrounding and spaced from the exhaust conduit, the inlet conduit having a transverse fuel port directing fuel against the exterior surface of the exhaust conduit, the outer end of the inlet conduit being joined to the exhaust conduit to form a drip cup below the fuel port.

2. A device of the class described combining an exhaust manifold having an exhaust conduit, and an intake manifold surrounding and spaced from the exhaust manifold and having an inlet conduit surrounding and spaced from the exhaust conduit, the inlet conduit having a transverse fuel port directing fuel against the exterior surface of the exhaust conduit, the intake conduit having a deflecting surface above the fuel port and having its outer end joined to the exhaust conduit to form a drip cup below the fuel port.

3. A device of the class described combining an exhaust manifold having an exhaust conduit, an intake manifold surrounding and spaced from the exhaust manifold and having an inlet conduit surrounding and spaced from the exhaust conduit, the inlet conduit having two transverse fuel ports, the terminal ends of the intake manifold being joined to the exhaust manifold and the outer end of the inlet conduit being joined to the exhaust conduit below the fuel ports.

Signed at Los Angeles, California, this 29th day of June, 1920.

BERT D. FOSTER.

Witnesses:
CLARENCE B. FOSTER,
MINA L. MOHN.